United States Patent [19]

Alligood

[11] Patent Number: 4,899,187

[45] Date of Patent: Feb. 6, 1990

[54] MIRROR SYSTEM FOR A SINGLE LENS REFLEX CAMERA

[75] Inventor: John H. Alligood, Penfield, N.Y.

[73] Assignee: Eastman Kodak Company, Rochester, N.Y.

[21] Appl. No.: 364,918

[22] Filed: Jun. 12, 1989

[51] Int. Cl.[4] .............................................. G03B 19/12
[52] U.S. Cl. ..................................... 354/152; 354/155
[58] Field of Search ............... 354/152, 153, 154, 155, 354/156

[56] References Cited

U.S. PATENT DOCUMENTS

| | | | |
|---|---|---|---|
| 589,349 | 8/1897 | Holst . | |
| 713,629 | 11/1902 | Garfield . | |
| 2,057,198 | 10/1936 | Marcussen | 354/153 |
| 2,980,001 | 4/1961 | Sauer et al. | 354/155 |
| 3,020,815 | 2/1962 | Landbrecht | 354/154 |
| 3,532,044 | 10/1970 | Shimomura | 354/156 |
| 3,540,365 | 11/1970 | Ono et al. | 354/152 |
| 3,675,557 | 7/1972 | Yokozato . | |
| 4,114,172 | 9/1978 | Yao | 354/153 |
| 4,190,339 | 2/1980 | Arai | 354/156 |
| 4,201,458 | 5/1980 | Viering | 354/152 |
| 4,204,758 | 5/1980 | Haynes | 354/152 |
| 4,319,825 | 3/1982 | Newton | 354/293 |
| 4,673,271 | 6/1987 | Alfredsson | 354/152 |
| 4,723,140 | 2/1988 | Whiteside et al. | 354/155 |
| 4,777,502 | 10/1988 | Lawther | 354/155 |
| 4,786,927 | 11/1988 | Lawther | 354/153 |
| 4,786,928 | 11/1988 | Lawther et al. | 354/153 |

*Primary Examiner*—A. A. Mathews
*Attorney, Agent, or Firm*—Roger A. Fields

[57] ABSTRACT

In a single lens reflex camera, a mirror can be positioned in an upright light-reflecting position between the rear of the taking lens and the film to reflect the light rays that come through the lens on to a focusing screen of the viewfinder, and it can be positioned in an inverted non-reflecting position out of the way of the light rays to allow them to expose the film. The mirror is supported to pivot about two axes, forward toward the rear of the lens and downward to at least partially underneath the film, from its light-reflecting position to its non-reflecting position. According to a unique construction, the mirror is constrained to pivot first only about one of the axes and then only about the other axis to swing successively along respective arcs. This arrangement advantageously allows the back focus of the lens required to clear the mirror for movement from its light-reflecting position to its non-reflecting position to be reduced.

5 Claims, 3 Drawing Sheets

MIRROR SYSTEM FOR A SINGLE LENS REFLEX CAMERA

BACKGROUND OF THE INVENTION

CROSS-REFERENCE TO A RELATED APPLICATION

Reference is made to commonly assigned, copending application Ser. No. 128,844 entitled MIRROR SYSTEM FOR A SINGLE LENS REFLEX CAMERA, and filed Dec. 14, 1987 in the names of W. L. Burnham, J. S. Lawther, and R. F. Manley, now Pat. No. 4,786,928.

Field of the Invention

The invention relates generally to the field of photography, and particularly to a mirror system for a single lens reflex camera. More specifically, the invention relates to a mirror system which is improved to reduce the clearance required for movement of its swingable mirror.

Description of the Prior Art

Typically in a single lens reflex camera, a flip-up mirror is located between the objective (taking) lens and the film. The mirror is normally disposed at an angle of 45°, centered on the optical axis of the objective lens, but it can flip up about a pivot pin at the top of the mirror to lie flat. When the mirror is disposed at the 45° angle, it reflects the rays of light that come through the objective lens on to a ground glass screen in a viewfinder of the camera. A field lens and a penta-roof prism in the viewfinder direct the light rays through an eyelens at the rear of the camera to enable the subject to be photographed to be viewed through the objective lens. The prism has several reflecting surfaces which turn the image formed by the objective lens on the ground glass screen upright as well as right-way-round. When the mirror is flipped up to lie flat, it covers the underside of the ground glass screen and the light rays from the objective lens fall on the film. The positioning of the mirror is such that when an image of the subject to be photographed is focused on the ground glass screen, with the mirror at the 45° angle, the same image falls into focus on the film when the mirror is flipped out of the way.

In many reflex cameras, the mirror is moved out of the way by a spring which is released immediately before the shutter mechanism is actuated to take a picture in response to finger pressure against a shutter release button on the outside of the camera body. The mirror there has to be retensioned before every exposure (and in fact before an image can be observed again on the ground glass screen). On most reflexes this retensioning is coupled with the film transport and/or shutter tensioning. Alternatively, an instant return mirror may be employed. The mirror there flips back immediately after the exposure.

Movement of the flip-up mirror between its 45° position and its flipped-up position requires a fair amount of space. Consequently, the objective lens must have a sufficient back focus to provide ample clearance for the miror movement. Various systems have been tried to reduce the clearance required. One of the earliest consists of supporting the mirror along its horizontal center axis, and swinging it back and up rather than hinging it at the top. More modern designs involve systems where the mirror drops down into the bottom of the camera, or folds up along its middle. Another variation, used in 18×24 mm miniature reflexes, is a sideways mirror movement. Since the 18×24 mm image is upright in the camera, this movement along the long side of the negative takes up less space. A further variation is suggested in the patent application cross-referenced above.

There, the mirror is supported to swing forward toward the rear of the objective lens and downward to at least partially underneath the film, simultaneously about respective pivot axes, from its 45° position to an inverted position substantially facing the bottom of the camera.

SUMMARY OF THE INVENTION

According to the invention, there is provided an improved single lens reflex camera wherein (a) a unitary mirror can be positioned in a light-reflecting position between the rear of a taking lens and the film to reflect the rays of light that come through said lens on to a focusing screen of a viewfinder, and can be positioned in a non-reflecting position substantilly facing the bottom of the camera to allow the rays of light that come through the lens to expose the film, and (b) supporting means supports said mirror to pivot about two axes, forward toward the rear of the lens and downward to at least partially underneath the film, from the light-reflecting position to the non-reflecting position, and wherein the improvement comprises:

said supporting means includes compound motion means for enabling said mirror to pivot first only about one of the axes then only about the other axis; and change-over means cooperates with said compound motion means for effecting a change-over of mirror movement from about one of the axes to about the other axis.

This arrangement advantageously allows the back focus of the taking lens required to clear the mirror for movement from its light-reflecting position to its non-reflecting position to be reduced as compared to prior art devices.

DETAILED DESCRIPTION OF THE PREFERRED EMBODIMENT

The invention is disclosed as being embodied preferably in a single lens reflex 35 mm camera. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
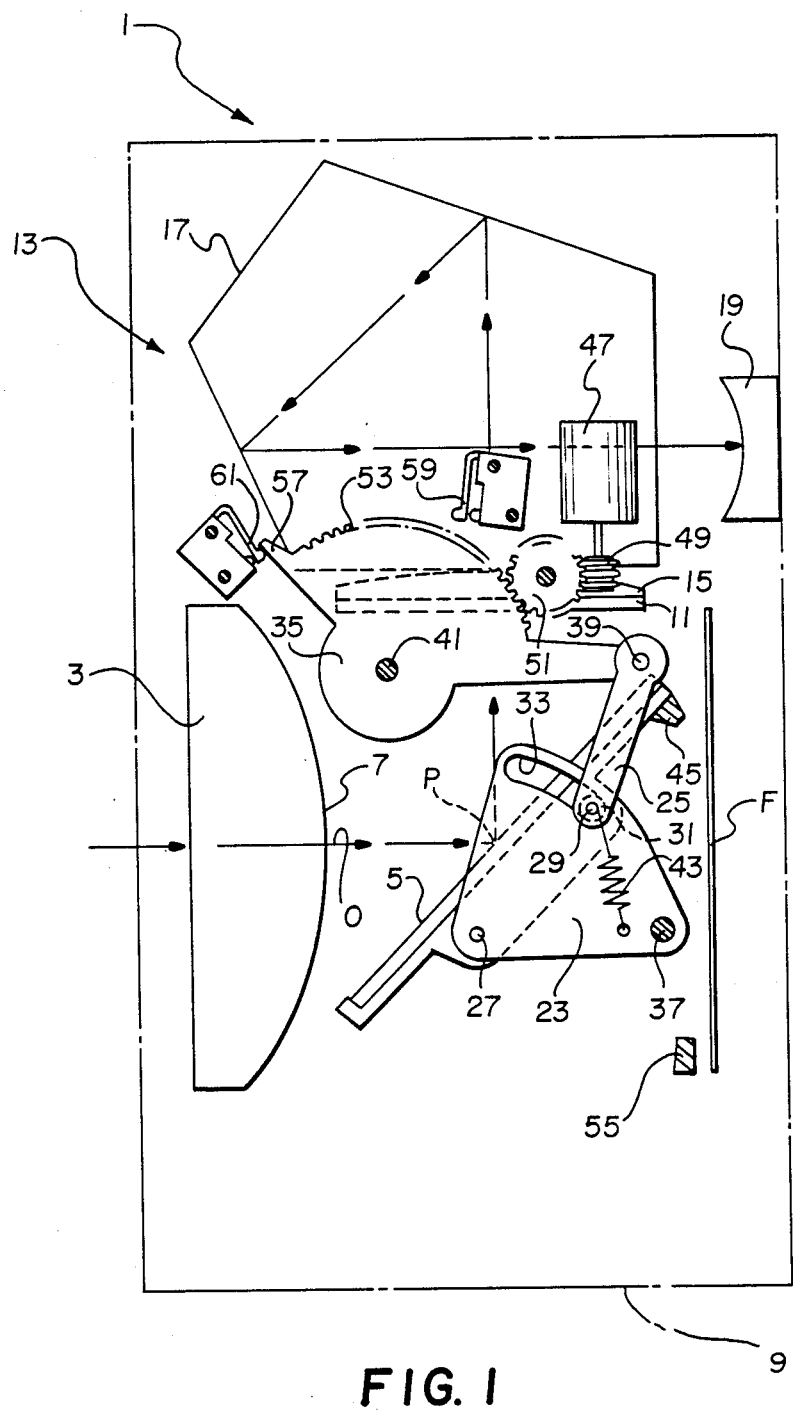
FIG. 1 is a side elevation view of the conventional optics in a single lens reflex camera, and an improved mirror system for use with the optics in accordance with a preferred embodiment of the invention.
Figure 3:
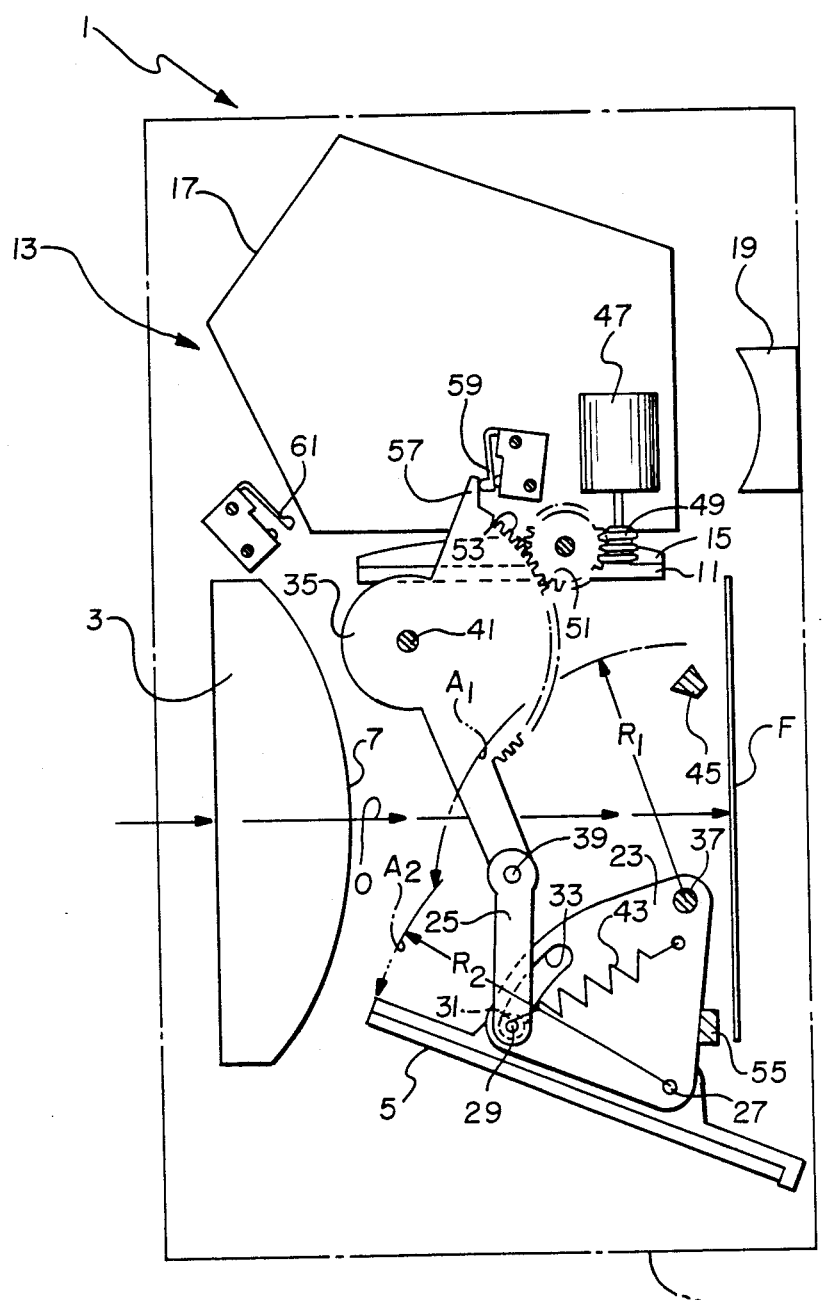

Referring now to the drawings, FIG. 1 shows certain elements of a single lens reflex 35 mm camera 1. The camera 1 includes an objective or taking lens 3 for focusing an image of the subject being photographed on a 35 mm film frame F. Conventional means, such as a pressure plate and a pair of parallel rails, not shown, support the film frame F in the focal plane of the taking lens 3. A mirror 5 is normally located between the rear 7 of the taking lens 3 and the film frame F. The mirror 5 is disposed at an angle of approximately 45°, centered on the optical axis 0 of the taking lens 3, but it can be swung to an inverted position substantially facing the bottom 9 of the camera 1 and partially extending underneath the film frame F as shown in FIG. 3. When the mirror 5 is positioned at the 45° angle, it reflects the rays of light that come through the taking lens 3 on to a ground glass screen 11 of a viewfinder 13 of the camera 1. A field lens 15 and a penta-roof prism 17 in the viewfinder 13 direct the light rays through an eyelens 19 at the rear of the camera 1 to enable the subject to be photographed to be viewed through the taking lens 3. The prism 17 has several reflecting surfaces which turn the image formed by the taking lens 3 on the ground glass screen 11 upright as well as right-way-round. When the mirror 5 is swung to its inverted position, the light rays from the taking lens 3 fall on the film frame F. The positioning of the mirror 5 is such that when an image of the subject to be photographed is focused on the ground glass screen 11, with the mirror at the 45° angle, the same image falls into focus on the film frame F when the mirror is swung out of the way.

If a conventional focal plane shutter, not shown, is employed in the camera 1, the protection of the film frame F against ambient light during viewing and focusing raises no special problems: the shutter blades cover the film frame at all times except during the actual exposure. As the mirror 5 is swung out of the way from its 45° light-reflecting position shown in FIG. 1 to its inverted or non-reflecting position shown in FIG. 3, the light rays fall only on the blind of the focal plane shutter, but as the mirror reaches the lower limit of its travel, it presses against a release trigger which by known means, not shown, releases the shutter blades to make the exposure.

When the focal plane shutter is opened, with the mirror 5 in its inverted position, separate means must be provided for covering the underside of the ground glass screen 11 to prevent ambient light entering the prism 17 through the eyelens 19 from reaching the film frame F and to prevent the rays of light coming through the taking lens 7 from reflecting off the ground glass screen on to the film frame. Typical means for this purpose are a roller blind shutter or a special capping plate which is actuated to obscure the underside of the ground glass screen 11. Also, an auxiliary shutter or cover may be provided to close the eyelens 19.

If a conventional diaphragm shutter, not shown, is employed in the camera 1, rather than a focal plane shutter, the design requirements become more complex, since the shutter must be open for viewing and focusing, but still let no light through to the film frame F. This is achieved by a more involved shutter cycle and by the provision of a special capping plate which normally closes the film aperture, not shown, in the back of the camera 1 to cover the film frame F. The shutter cycle provides a possibility of continuous opening (for viewing and focusing) and normal opening and closing to control the exposure. During viewing, the shutter is open (and the lens diaphragm fully open as well), but the capping plate is closed to cover the film frame F. On pressing the release button to make the exposure, the shutter closes, the lens diaphragm closes down to a preselected aperture, the mirror and capping plate swing out of the way, and the shutter opens and closes again for the actual exposure. The capping plate may be used to obscure the underside of the ground glass screen 11 when it is swung out of the way.

According to the preferred embodiment of the invention, the mirror 5 is supported for its swinging movement between the light-reflecting position shown in FIG. 1 and the inverted or non-reflecting position shown in FIG. 3 by compound motion means comprising a swing plate 23 and a swing arm 25. The swing plate 23 and the swing arm 25 are pivotally connected to the mirror 5 via respective pivot pins 27 and 29 at two spaced locations, one generally above and the other generally below the point P on the mirror which intercepts the optical axis O of the taking lens 3 when the mirror is in its light-reflecting position. The pivot pin 29 includes an integral guide collar 31 which is constrained for movement within an arcuate slot 33 in the swing plate 23. See FIGS. 1 and 3. The swing plate 23 and the swing arm 25 are pivotally connected, respectively, to the body of the camera 1 and to an actuating plate 35 via pivot pins 37 and 39. A pivot pin 41 mounts the actuating plate 35 to the body of the camera 1. A helical tension spring 43 connecting the swing plate 23 and the pivot pin 29 normally serves to lightly maintain the mirror 5 against a fixed stop 45 when the mirror is in its light-reflecting position.

Operation

Figure 2:
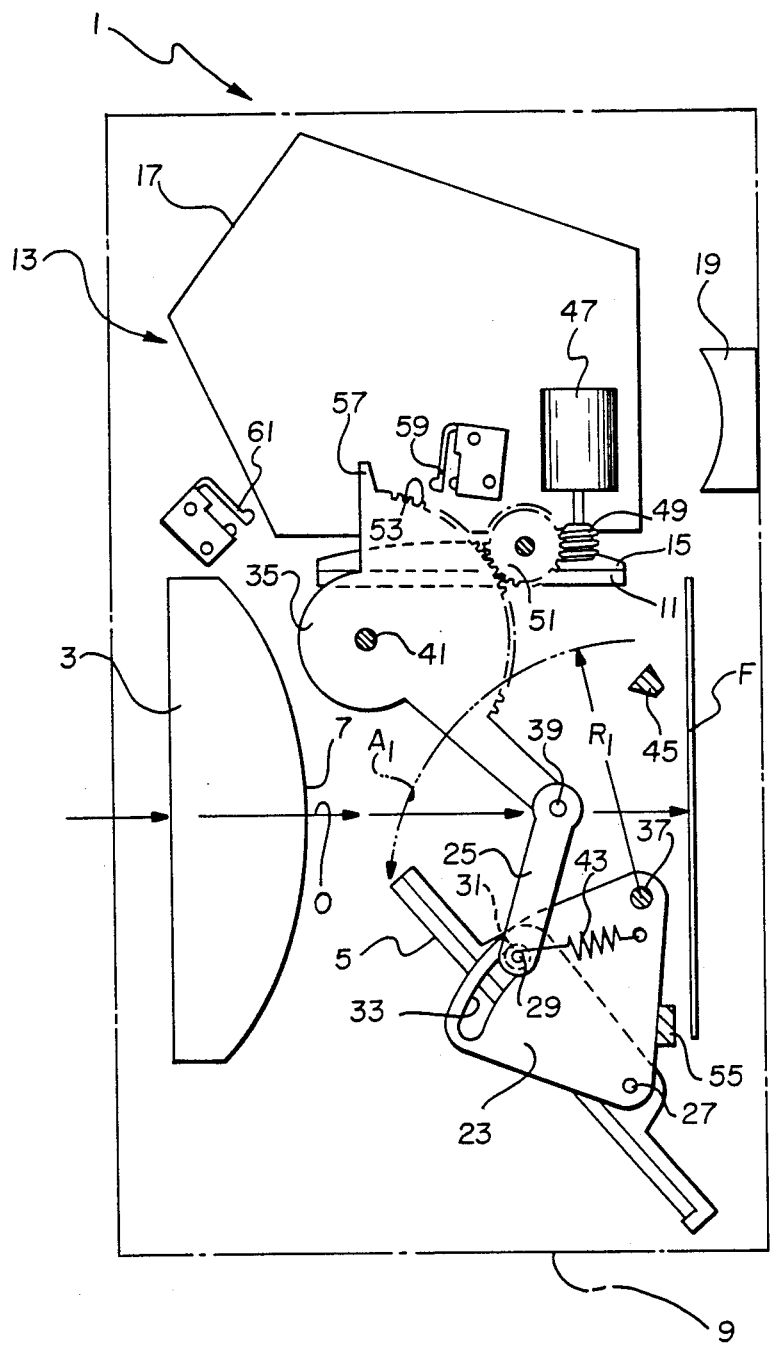
FIGS. 2 and 3 are views similar to FIG. 1, depicting successive stages of operation of the improved mirror system.

When the release button is pressed to make the exposure, a conventional drive motor 47 is energized in a forward mode by known means, not shown, to rotate a coaxial cylinder gear 49 to, in turn, rotate an intermediate disk gear 51 counter-clockwise in FIG. 1 about its center. Since the intermediate gear 51 is in continuous engagement with a sector gear 53 of the actuating plate 35, the actuating plate will be swung clockwise in FIG. 1 about its pivot pin 41. This causes the swing plate 23 by means of the swing arm 25 and the tension spring 43 to be swung counter-clockwise in FIG. 1 about its pivot pin 37 to thereby similarly swing the mirror along a first arc $A_1$ having a radius $R_1$ measured from the pivot axis at the pivot pin. As shown in FIG. 2, the swing plate 23 is halted by a fixed stop 55. Then, since the actuating plate 35 continues to be swung clockwise in FIG. 2 about its pivot pin 41, the swing arm 25 will be moved along the arcuate slot 33 of the swing plate 23 to thereby pivot the mirror 5 counter-clockwise in FIG. 2 about its pivot pin 27. As shown in FIG. 3, the mirror 5 is swung along a second arc $A_2$ having a radius $R_2$ measured from the pivot axis at the pivot pin 27. Thus, the fixed stop 55 cooperates with the swing plate 23 to effect a change-over of mirror movement from about the pivot axis at the pivot pin 37 to about the pivot axis at the pivot pin 27.

When the mirror 5 reaches its inverted or non-reflecting position as shown in FIG. 3, an integral finger 57 of the actuating plate 35 is moved against a limit switch 59 to thereby close the switch and, in turn, de-energize the motor 47. After the exposure is made, known means, not shown, re-energizes the motor 47 in a reverse mode to reverse the cycle just described, to return the mirror 5 to its light-reflecting position as shown in FIG. 1. When the mirror 5 reaches the light-reflecting position, the finger 57 of the actuating plate 35 is moved against a limit switch 61 to thereby close the swing and, in turn, de-energize the motor 47.

The invention has been described in detail with reference to a preferred embodiment. However, it will be understood that variations and modifications can be effected within the spirit and scope of the invention.

I claim:

1. An improved single lens reflex camera wherein (a) a unitary mirror can be positioned in a light-reflecting position between the rear of a taking lens and the film to reflect the rays of light that come through said lens on to a focusing screen of a viewfinder, and can be positioned in a non-reflecting position substantially facing the bottom of said camera to allow the rays of light that come through the lens to expose the film, and (b) supporting means supports said mirror to pivot about two axes, forward toward the rear of said lens and downward to at least partially underneath the film, from the light-reflecting position to the non-reflecting position, and wherein the improvement comprises:

said supporting means includes compound motion means for enabling said mirror to pivot first only about one of said axes then only about the other axis; and change-over means cooperates with said compound motion means for effecting a change-over of mirror movement from about one of said axes to about the other axis.

2. The improvement as recited in claim 1, wherein said compound motion means enables said mirror to swing only along a first arc when it is pivoted about one of said axes and to swing only along a second arc when it is pivoted about the other axis.

3. The improvement as recited in claim 2, wherein said first arc is spaced a radius $R_1$ from the axis about which said mirror is pivoted, when the mirror is swung along that arc, and said second arc is spaced a radius $R_2$ from the axis about which the mirror is pivoted, when the mirror is swung along that arc, the radius $R_2$ being greater than the radius $R_1$.

4. The improvement as recited in claim 2, wherein said change-over means includes a fixed stop positioned with respect to said compound motion means to prevent movement of said mirror further along said first arc but to allow movement of the mirror along said second arc.

5. An improved single lens reflex camera wherein (a) a unitary mirror can be positioned in a light-reflecting position between the rear of a taking lens and the film to reflect the rays of light that come through said lens on to a focusing screen of a viewfinder, and can be positioned in a non-reflecting position substantially facing the bottom of said camera to allow the rays of light that come through the lens to expose the film, and (b) supporting means supports said mirror to pivot about two axes, forward toward the rear of said lens and downward to at least partially underneath the film, from the light-reflecting position to the non-reflecting position, and wherein the improvement comprises:

said supporting means includes compound motion means for enabling said mirror to pivot first only about one of said axes and then only about the other axis to swing the mirror successively along respective arcs; and a fixed stop is positioned with respect to said compound motion means to prevent pivoting of said mirror further about one of said axes to limit swinging of the mirror along one of the arcs and to allow pivoting of the mirror about the other axis to allow swinging of the mirror along the other arc.

* * * * *